United States Patent [19]
Mazur

[11] 3,779,575
[45] Dec. 18, 1973

[54] STEERING SYSTEM WITH INTEGRAL SHOCK DAMPER

[75] Inventor: Sylvester S. Mazur, Detroit, Mich.

[73] Assignee: TRW Inc., Cleveland, Ohio

[22] Filed: Aug. 5, 1971

[21] Appl. No.: 169,424

[52] U.S. Cl................ 280/95 R, 188/1 B, 267/113, 280/90, 280/94
[51] Int. Cl.............................................. B62d 7/16
[58] Field of Search................. 280/90, 95 R, 95 A, 280/89, 94; 267/113; 188/1 B

[56] References Cited
UNITED STATES PATENTS

| | | | |
|---|---|---|---|
| 3,279,814 | 10/1966 | Fadow et al. | 280/95 A |
| 3,525,533 | 8/1970 | Mazur | 280/95 R |
| 2,761,694 | 9/1956 | Graham | 280/95 R |
| 2,955,667 | 10/1960 | Cota | 280/90 X |
| 2,847,079 | 8/1958 | Cota | 280/95 R X |
| 2,277,197 | 3/1942 | Ash | 280/90 X |
| 3,282,602 | 11/1966 | Willingshofer et al. | 280/96.2 R |
| 3,395,769 | 8/1968 | Sulien | 280/96.2 R X |
| 3,037,787 | 6/1962 | Gottschald | 280/96.2 A |

FOREIGN PATENTS OR APPLICATIONS

| | | | |
|---|---|---|---|
| 1,430,762 | 12/1968 | Germany | 280/90 |

*Primary Examiner*—Kenneth H. Betts
*Assistant Examiner*—John P. Silverstrim
*Attorney*—Carlton Hill et al.

[57] ABSTRACT

A centerlink type steering linkage having one end of the centerlink supported by the pitman arm and the other end of the centerlink inserted into a shock absorber and terminating in a piston end positioned interiorly of the shock absorber, the shock absorber being pivotably mounted to a frame-carried bracket.

7 Claims, 3 Drawing Figures

INVENTOR.
Sylvester S. Mazur

BY Hill, Sherman, Meroni, Gross & Simpson ATTORNEYS

STEERING SYSTEM WITH INTEGRAL SHOCK DAMPER

BACKGROUND OF THE INVENTION

1. Field Of The Invention

This invention relates to steering linkages and more particularly to a shock absorbing steering linkage.

2. Prior Art

Among the various types of steering linkages known to the prior art are those which use a cross bar or centerlink. A typical prior art centerlink linkage has one end of the centerlink supported by the pitman arm and the other end of the centerlink supported and attached to an idler arm which in turn is attached to the frame of the vehicle. As the pitman arm rotates under the influence of the steering gear, the centerlink is shifted transversely of the vehicle in an arcuate path. The use of the idler arm accommodates the arcuate movement while supporting the opposite end of the centerlink.

Many vehicles, because of various features, transmit substantial road shock through the wheels to the tie rods connecting the steering bar of the wheels to the centerlink. In this manner, the road shock is transmitted to the centerlink and upwardly through the pitman arm and steering gear to the steering column and steering wheel where the driver encounters objectionable vibration.

Some prior art linkages have suggested reducing this driver encountered vibration by attaching a shock damper by means of clamps or other devices to the centerlink. While such devices are effective in reducing vibration, some vibration is still transmitted.

Recently, a new type of steering linkage has been developed, wherein the end of the centerlink opposite the pitman arm is pivotably supported in a frame-carried bushing, thereby eliminating the idler arm. (See for example my U.S. Pat. No. 3,525,133). While such modified linkages present many advantages, it is still possible for vibration to be transmitted from road shock to the steering wheel.

SUMMARY OF THE INVENTION

This invention is designed to minimize or eliminate the transmission of such road shock in a steering linkage of the type described in U.S. Pat. No. 3,525,133. Rather than utilizing a shock damper clamped to the centerlink as has been suggested by the prior art, I have provided a shock absorber attached to the frame of the vehicle in a pivotable attachment member. The end of the centerlink opposite the pitman arm end has an elongated extension thereon which terminates in a piston which is received interiorly of the shock absorber. In this manner, the end of the centerlink functions as the telescoped portion of the shock absorber, the end being movable longitudinally of the shock absorber under the restrictive influences of fluid flow normally encountered in shock absorbers.

While the shock absorber to be used with this invention may take many forms, I have illustrated herein a fluid bath shock absorber wherein fluid is moved through restricting ports in response to movement of the piston.

It is therefore an object of this invention to provide an improved steering linkage having shock absorbing capabilities.

It is a further and more important object of this invention to provide a centerlink type steering linkage wherein the idler arm is eliminated and shock absorbing capabilities are provided.

It is yet another and more important object of this invention to provide an improved centerlink type steering linkage wherein one end of the centerlink is attached to the frame through a shock absorber device.

It is a further and more specific object of this invention to provide an improved shock absorbing steering linkage wherein one end of the centerlink of the linkage is received interiorly of a frame supported pivotable shock absorber and functions as a telescoped portion of the shock absorber, the centerlink end terminating in a piston.

BRIEF DESCRIPTION OF THE DRAWINGS

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
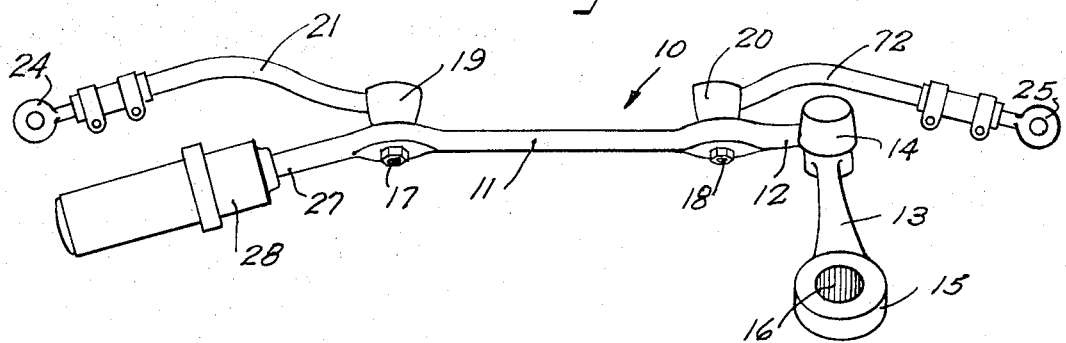
FIG. 1 is a perspective view of a steering linkage according to this invention.

FIG. 1 is a perspective view of a steering linkage 10 according to this invention. The linkage 10 includes a centerlink 11 which has one end 12 attached to a pitman arm 13 through a ball joint 14. The other end 15 of the pitman arm has an aperture 16 therein adapted to be attached to the steering gear of a vehicle. Intermediate the ends of the centerlink 11 are attachment points 17 and 18 for attaching the studs of ball joints 19 and 20 to the steering link. The ball joints 19 and 20 are attached to the tie rods 21 and 22, the other ends of which receive ball joints 24 and 25 which are attached to the steering bars of the dirigible wheels of a vehicle. The end 27 of the centerlink 11 remote from the end 12 is received in a shock absorber 28.

Figure 2:
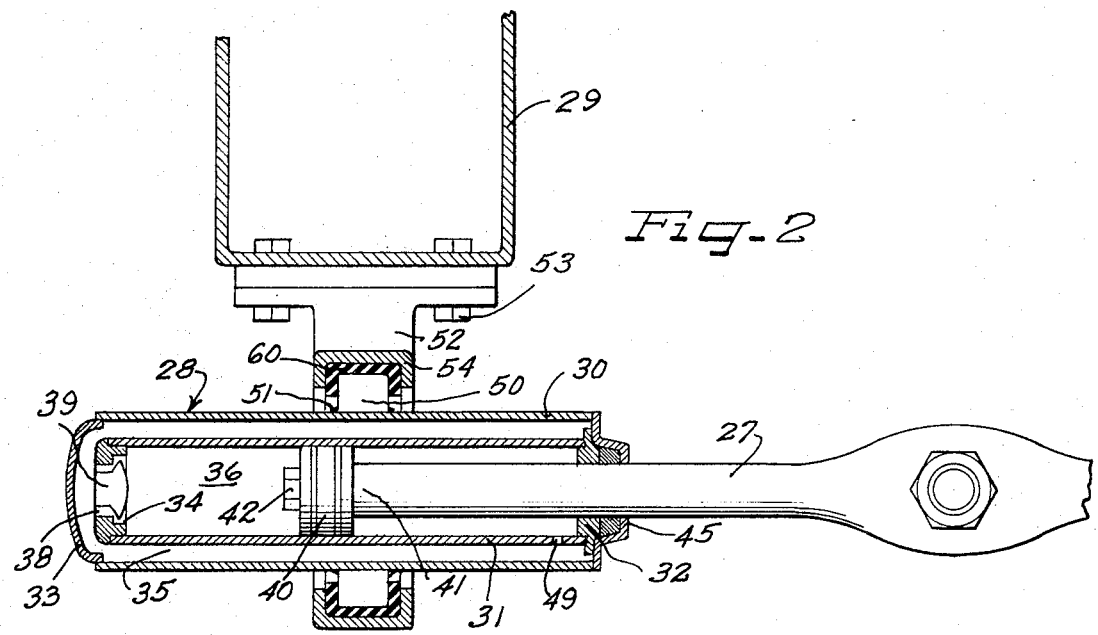
FIG. 2 is a fragmentary cross-sectional view of the frame-supported shock absorber and centerlink end of this invention.

As best illustrated in FIG. 2, the shock absorber 28 is attached to the frame 29 of a vehicle or to a bracket attached to the frame.

The shock absorber 28 illustrated is of a standard type having an outer housing 30 and an inner housing 31 commonly attached to an end cap 32 at one end. The outer housing has an end cap 33 at the other end which is spaced from an end cap 34 on the end of the inner housing 31. The space 35 between the inner and outer housings provides a fluid reservoir and the interior 36 of the inner housing is normally filled with fluid. The end cap 34 on the inner housing has a passage port 38 therethrough allowing movement of fluid between the area 35 and the area 36. A restricting plug 39 is received in the end cap 34 which restricts the opening of the port 38 thereby limiting fluid movement from the area 35 to the area 36. A piston 40 is attached to the end 41 of the end portion 27 of the centerlink 11 as by means of a bolt or the like 42. The piston has a diameter substantially equal to the diameter of the inner housing 31. The end portion 27 of the centerlink 11 projects through a sealed opening 45 in the end cap 32, common to the inner and outer housings 30 and 31 and thence into the inner housing. The end portion 27 is movable longitudinally of the shock absorber 28 and is telescoped therein. In this manner the piston 40 is movable back and forth in the chamber 36 of the inner housing. Bleed ports 49 may be provided between the inner chamber 36 and the chamber 35 on the opposite side of the piston 40 from the end cap 34. Thus, movement of the piston attached to the end of the centerlink within the shock absorber causes transference of fluid from the chamber 35 to the chambers 36 some of which transference occurs through the restricted port 38. The shock absorber illustrated is a simple type and it is to be understood that any type of telescoped shock absorber may be substituted for the shock absorber described.

In the preferred embodiment illustrated, a carrier ring 50 is attached to the outer diameter of the outer housing 30 as by means of welding as at 51. The carrier ring 50 forms the attachment point for the shock absorber to the frame 29. A bracket 52 is attached to the frame 29 as by means of bolts 53. The bracket includes a ring of U-shaped cross section material 54. The ring 54 has an inner dimension greater than the outer dimension of the carrier ring 50 whereby the carrier ring is receivable interiorly of the ring 54 and retained therein due to the U-shaped cross-section nature of the ring 54. An elastomer pad or other compressible material ring 60 is entrapped between the carrier ring 50 and the U-shaped cross-section ring 54 of the bracket 52. The elastomer ring 60 allows for pivotability of the carrier ring 50 with respect to the bracket 52. This pivotability allows the shock absorber 28 to be pivoted in its mounting.

The pivotability of the shock absorber is important to the construction of the steering linkage of this device for the following reasons. As the steering gear activates the pitman arm, the pitman arm rotates. While this rotation is always less than 180°, the motion that it imparts to the end 12 of the centerlink is an arcuate motion moving the end of the centerlink both transverse of the vehicle and longitudinally of the vehicle through an arc. While it is of primary importance that the end 27 of the steering linkage move transversely, thereby shifting the attachment points of the tie rods 21, 22 and steering the wheels, in order to attain parallel steering between the wheel attached to the centerlink 22 and the wheel attached to the centerlink 21, it is desirable that the end 27 of the centerlink transcribe a movement identical to the arcuate movement of the end 12. This provides a true parallel steering. In order to allow the end 27 to move, the bracket attachment between the end 27 and the frame 29 must accommodate a pivoting movement. This could be accomplished either by allowing the end 27 to pivot within a fixed absorber or by allowing the shock absorber itself to pivot. In the preferred embodiment illustrated, the bracket connection between the frame 29 and the shock absorber 28 allows the shock absorber to pivot with respect to the frame. It is to be understood that this is the preferred embodiment, but that other embodiments may use a shock absorber of the type which would accommodate a pivotable movement between the telescoped end of the centerlink and a fixed shock absorber such as by way of example through a universal joint connection between the end 41 of the end portion 27 and the piston 40, coupled with a sufficiently large diameter inner housing 31 and a flexible seal on the end cap 32. In such a modified form, the shock absorber could be non-movably attached to the frame of the vehicle. Of course, other types of pivotable attachment can be substituted, if desired.

Figure 3:
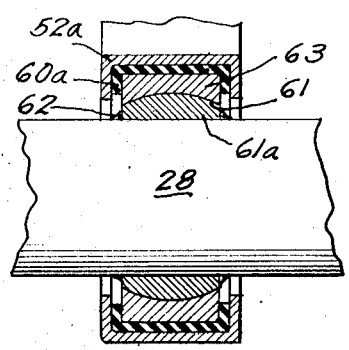
FIG. 3 is a fragmentary partially sectioned view of a modified form of support for the shock absorber of this invention.

In the embodiment illustrated in FIG. 2, the pivotable connection is accomplished by means of the compressibility of the elastomer ring 60. FIG. 3 illustrates a modification wherein the pivotability is accomplished by means of a spherical bearing connection between the shock absorber 28. Such a connection can include a spherical surfaced 61a carrier ring 61 attached to the exterior of the shock absorber by means of welding as at 62. The mating spherical surfaced ring 63 can then receive the ring 61a, providing for pivotability of the shock absorber 28 through rotation of the ring 61a when in the ring 63. The ring 63 itself may be attached to the frame through a fixed bracket or may alternatively be attached to the frame through a bracket 52a of the type described in connection with FIG. 2 and may include an elastomeric ring 60a, substantially the same as the ring 60, thereby providing for a vibration dampening connection.

It is of course to be understood that other types of mounts attaching the shock absorber to the frame are acceptable, the important feature being that the shock absorber is restrained against movement other than pivotable with respect to the frame in the preferred embodiment illustrated.

It will therefore be appreciated from the above that my invention provides for a steering linkage having one end of the centerlink connecting and actuating member telescopically received in a frame-carried shock absorber, the one end providing a functional portion of the shock absorber whereby road shock imparted to the member through the tie rods will be minimized or eliminated through the influence of the shock absorber. It will be appreciated that this device also reduces the transference of shocks imparted to the frame of the vehicle through the non-dirigible wheels to the linkage.

Although the teachings of my invention have herein been discussed with reference to specific theories and embodiments, it is to be understood that these are by way of illustration only and that others may wish to utilize my invention in different designs or applications.

I claim as my invention:

1. In a steering linkage having an arcuately movable centerlink member attached to the frame of a vehicle, the improvement of a shock absorbing device incorporated in the attachment whereby an end of the member is telescopically received in and is supported on the frame through the shock absorbing device.

2. The linkage of claim 1 wherein means are provided accommodating pivotability of a said end with respect to the frame.

3. The linkage of claim 2 wherein said means include a pivotable attachment between said shock absorbing device and the said frame whereby the said shock absorbing device is pivotably attached to the frame.

4. The linkage of claim 3 wherein the pivotable attachment includes a compressible pad entrapped between a frame-carried member and a shock absorber device carried member, the pad compressible to allow universal pivotability of the shock absorbing device with respect to the frame carried member.

5. The linkage of claim 3 wherein the pivotable attachment includes mating curved surface members one of said members operatively attached to and carried by the said frame and the other of said members attached to the said shock absorbing device, the said members are positionable one within the other to attach the said shock absorbing device to the said frame and the said mating curved surfaces allowing pivotability of one of said members with respect of the other of said members while maintaining the said attachment.

6. A steering linkage comprising a linkage assembly including a centerlink, one end of said centerlink attached to a pitman arm and movable therewith, the other end of said centerlink telescopically received in a shock absorbing device and movable longitudinally therein, said shock absorbing device pivotably attached to the frame of a vehicle receiving the steering linkage, the telescopic movability of the said end of the centerlink within the said shock absorbing device accommodating longitudinal movement of the one end of the centerlink as imparted to the centerlink by movement of the pitman arm and the said pivotable attachment of the shock absorbing device at the frame allowing arcuate movement of the said end of the said centerlink as imparted to the centerlink by the pitman arm.

7. The linkage of claim 6 wherein the end of the centerlink received in the shock absorbing device terminates in a piston received in an inner cylinder of the said shock absorbing device, and the said shock absorbing device including fluid chambers, said cylinder being one of said chambers, fluid in said chambers and restricted ports communicating said chambers and movement of the said piston within the said cylinder causing movement of the said fluid through the said ports whereby the device operates as a shock absorber.

* * * * *